(12) United States Patent
Weaver

(10) Patent No.: US 7,389,745 B2
(45) Date of Patent: Jun. 24, 2008

(54) CAGE FOR TRANSPORTING POULTRY

(75) Inventor: Richard L. Weaver, Myerstown, PA (US)

(73) Assignee: Marilyn J. Enterprises Inc., Myerstown, PA (US)

( * ) Notice: Subject to any disclaimer, the term of this patent is extended or adjusted under 35 U.S.C. 154(b) by 0 days.

(21) Appl. No.: 10/759,164

(22) Filed: Jan. 20, 2004

(65) Prior Publication Data

US 2005/0166859 A1 Aug. 4, 2005

(51) Int. Cl.
*A01K 31/07* (2006.01)
(52) U.S. Cl. .................. 119/440; 119/455; 119/458; 119/489
(58) Field of Classification Search ......... 119/440–442, 119/437, 453, 400–401, 406, 450, 462, 489 119/481, 455, 456, 458
See application file for complete search history.

(56) References Cited

U.S. PATENT DOCUMENTS

| | | | | |
|---|---|---|---|---|
| 747,243 | A * | 12/1903 | Scott | 119/441 |
| 1,192,867 | A * | 8/1916 | Collis | 119/455 |
| 1,276,723 | A * | 8/1918 | Collis | 119/455 |
| 2,212,549 | A * | 8/1940 | Olson et al. | 119/457 |
| 3,465,722 | A * | 9/1969 | Duff | 119/456 |
| 3,552,358 | A * | 1/1971 | Launder | 119/442 |
| 3,768,442 | A * | 10/1973 | Van Huis | 119/457 |
| 3,802,391 | A | 4/1974 | Peeler | 119/479 |
| 4,023,531 | A * | 5/1977 | Thompson | 119/458 |
| 4,046,107 | A * | 9/1977 | Kuster | 119/480 |
| 4,084,714 | A * | 4/1978 | Williams | 414/498 |
| 4,112,872 | A * | 9/1978 | Van Huis | 119/455 |
| 4,212,269 | A * | 7/1980 | White et al. | 119/458 |
| 4,365,591 | A * | 12/1982 | Wills et al. | 119/845 |
| 4,367,694 | A * | 1/1983 | Goyheneix | 119/455 |
| 4,448,152 | A * | 5/1984 | Niki | 119/451 |
| 4,471,720 | A * | 9/1984 | Hedeson et al. | 119/455 |
| 4,480,588 | A * | 11/1984 | Holladay et al. | 119/455 |
| 4,831,966 | A * | 5/1989 | Tutelian | 119/481 |
| 5,349,923 | A | 9/1994 | Sheaffer et al. | 119/418 |
| 5,596,950 | A | 1/1997 | Briggs et al. | 119/489 |
| 5,699,755 | A * | 12/1997 | Wills et al. | 119/846 |
| 6,338,316 | B1 * | 1/2002 | Weaver | 119/453 |
| 6,851,389 | B2 * | 2/2005 | Giordano et al. | 119/453 |
| 6,892,677 | B1 * | 5/2005 | Livingston et al. | 119/845 |
| 2003/0084856 | A1 * | 5/2003 | Hazenbroek et al. | 119/453 |
| 2003/0136350 | A1 * | 7/2003 | Giordano et al. | 119/453 |

* cited by examiner

*Primary Examiner*—Yvonne R. Abbott
(74) *Attorney, Agent, or Firm*—Anthony Asquith Corp.

(57) ABSTRACT

The cage comprises a metal support framework and plastic panels that define trays for containing live-poultry. Horizontal floor panels of the trays are domed and slitted to prevent pooling of water. Vertical fence panels are formed as open lattice boxes, combining good containment with good ventilation. Openable doors for the trays have a double-detent camming action, whereby the doors snap to open or snap to closed, whichever is closer. The cage is lifted on/off a truck with a fork lift.

20 Claims, 16 Drawing Sheets

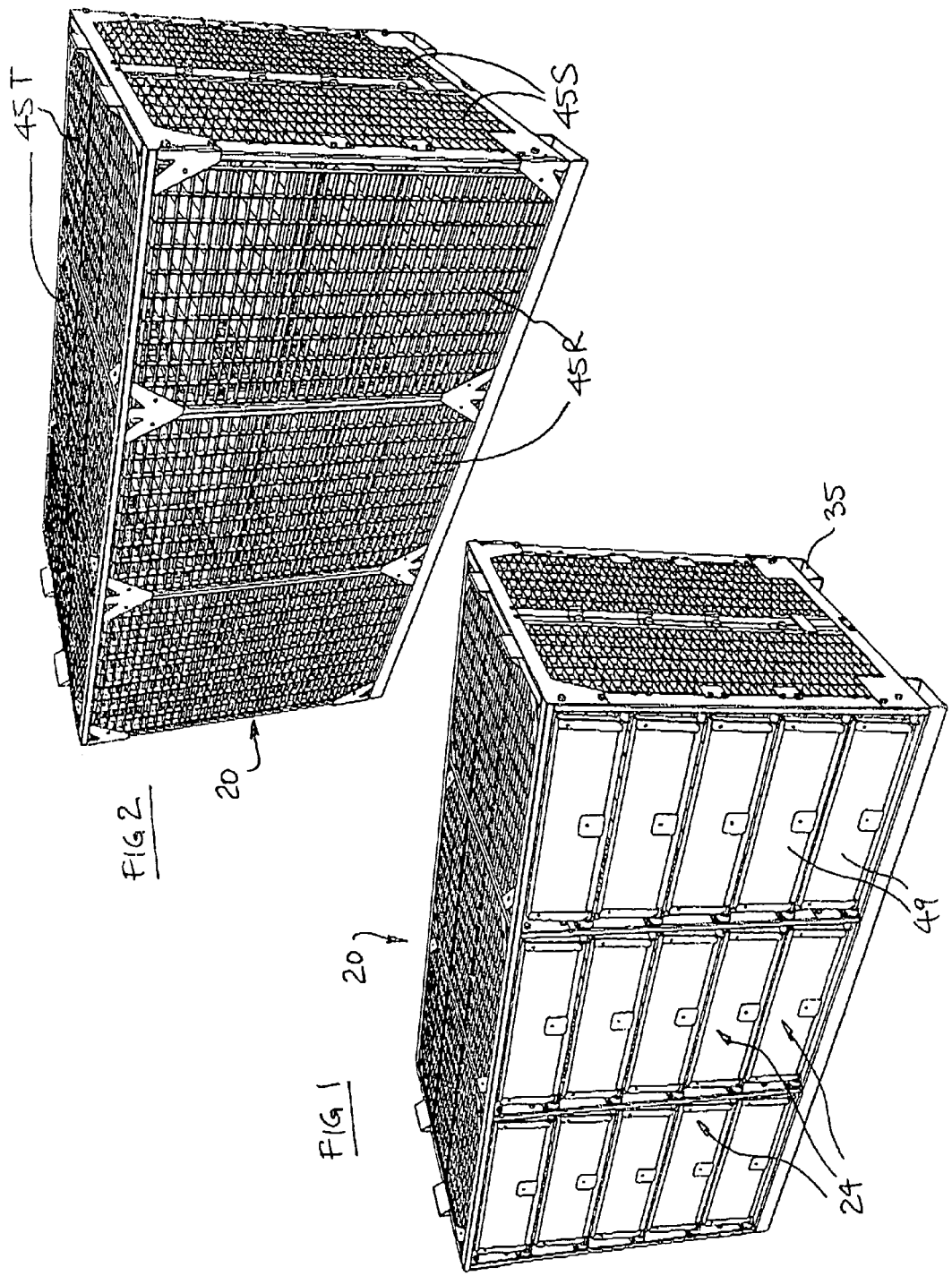

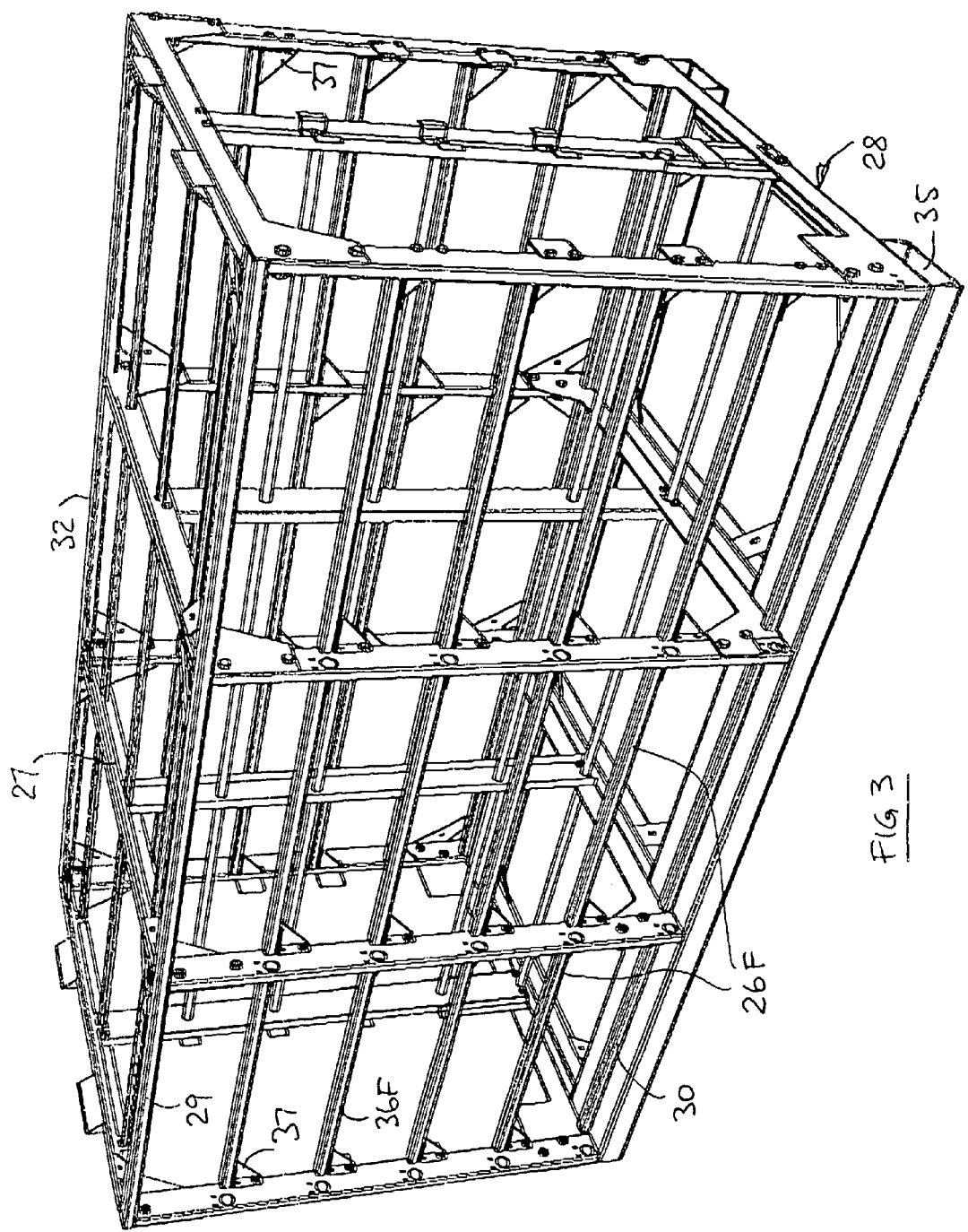

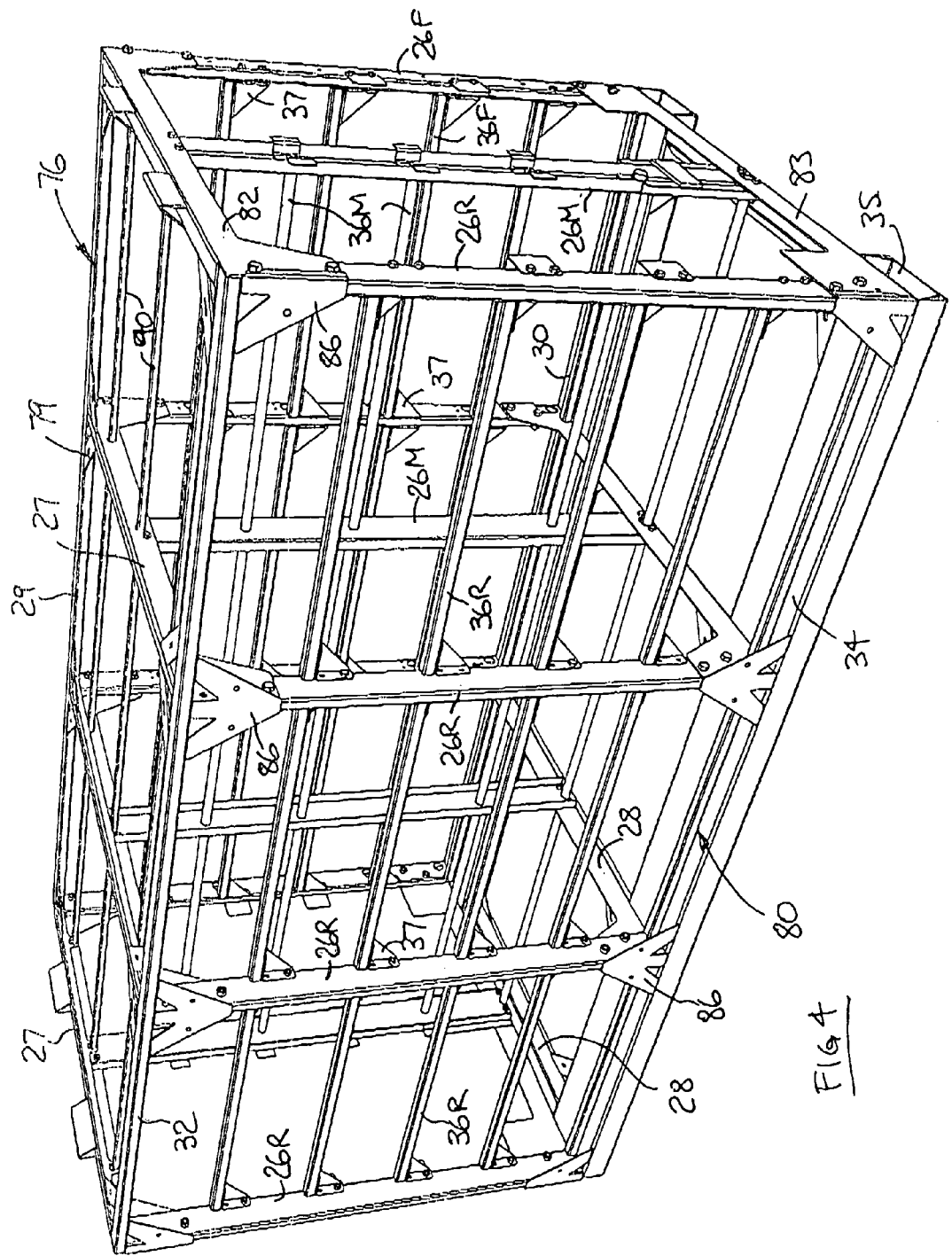

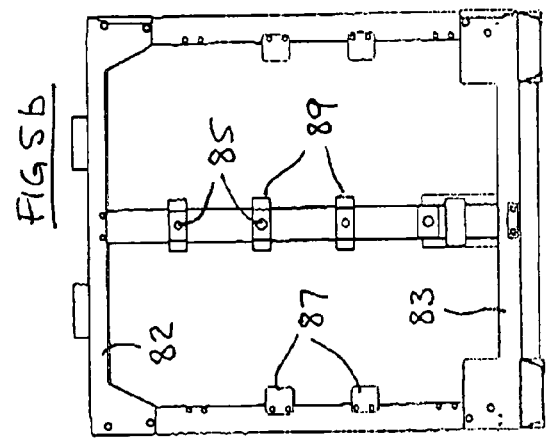
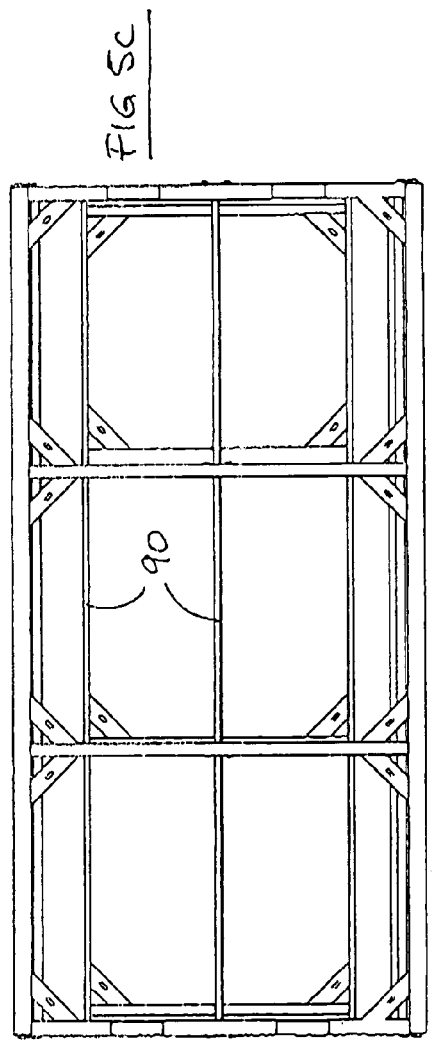
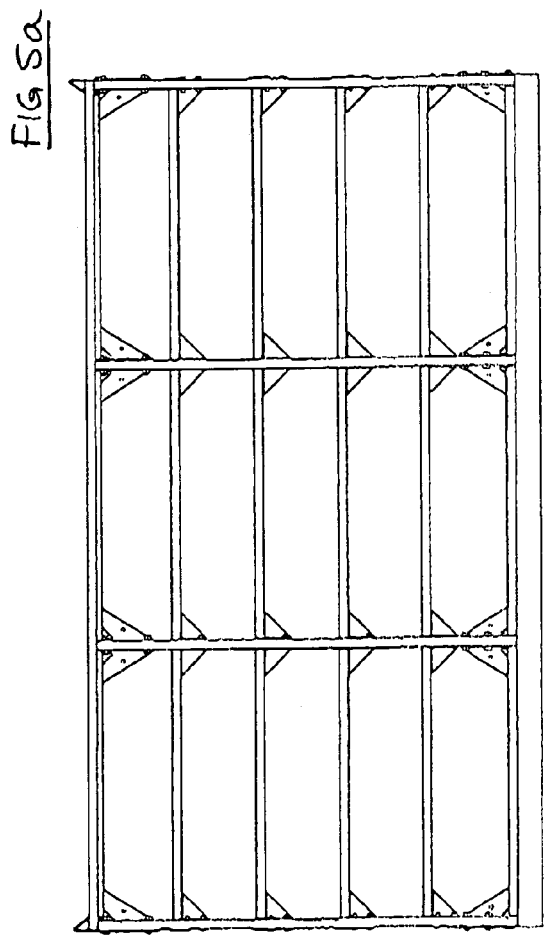

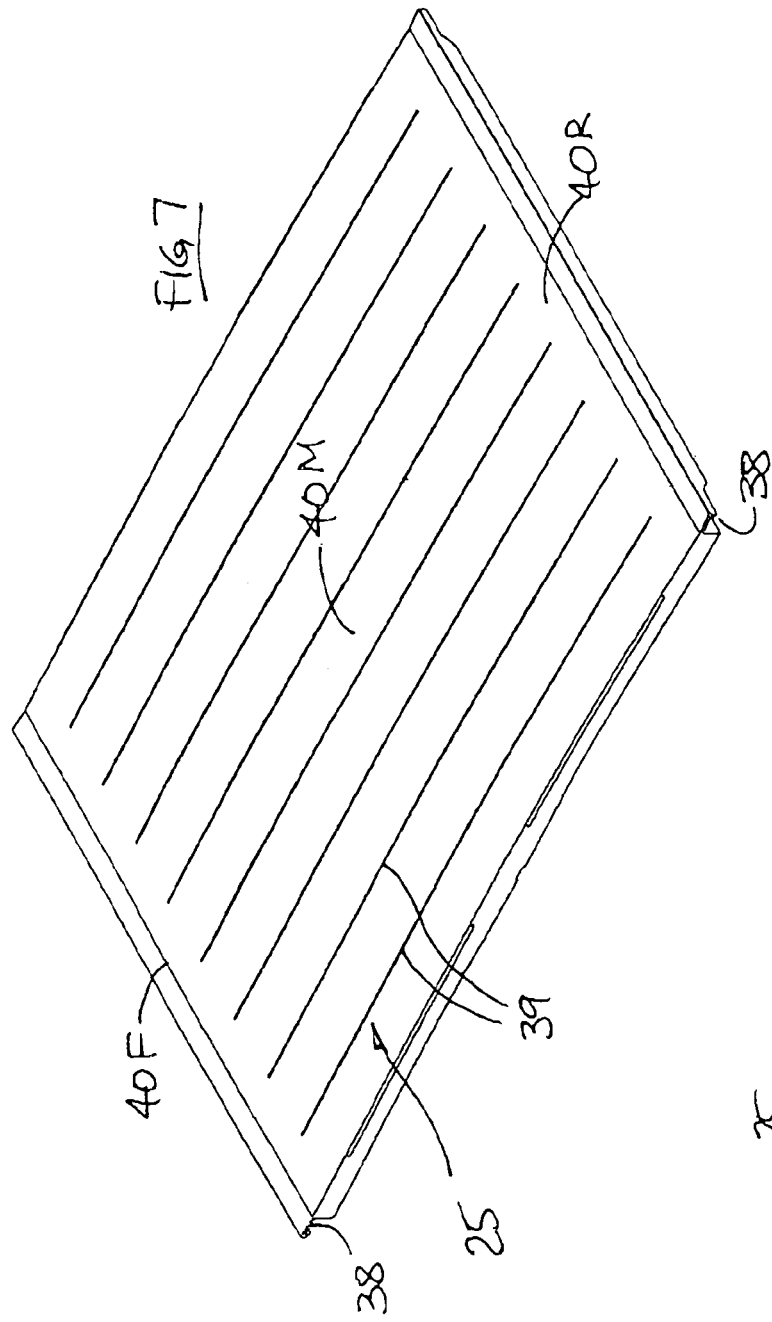
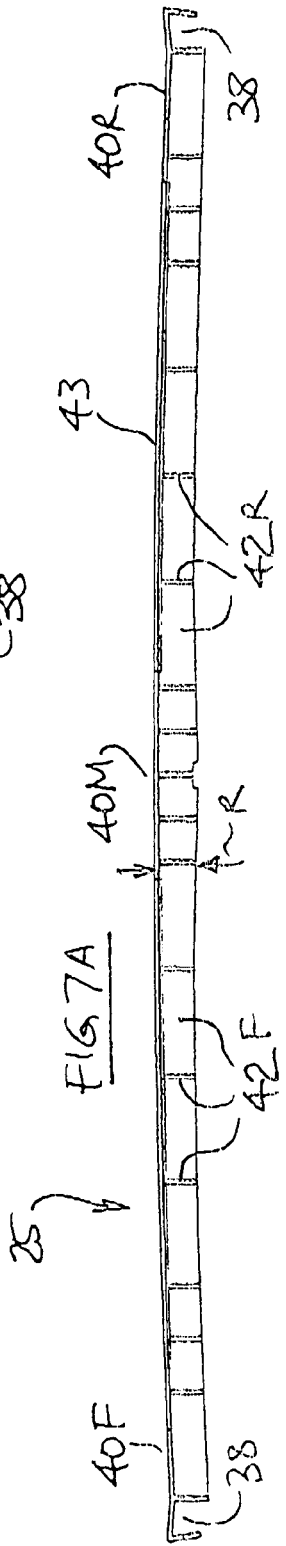

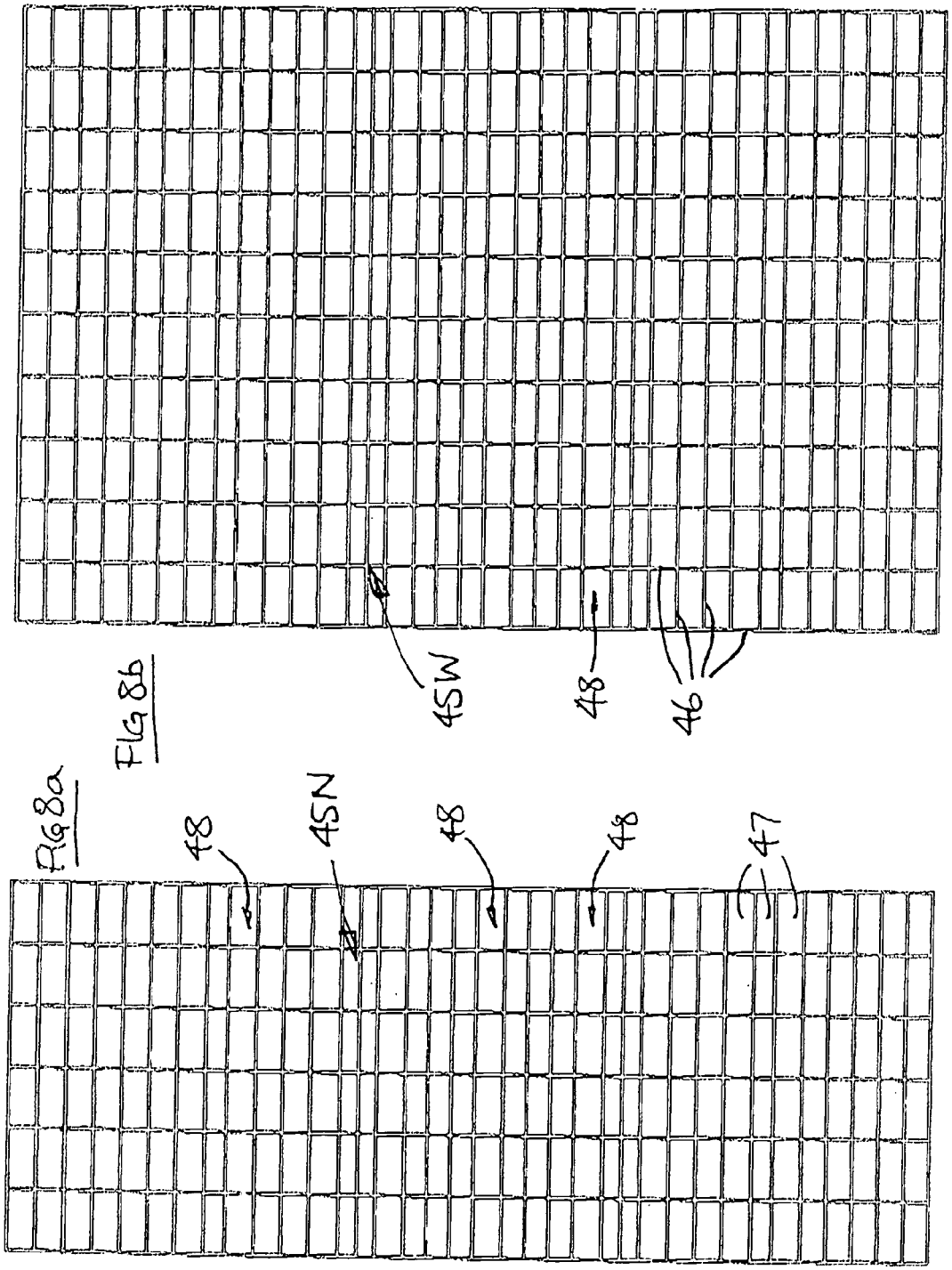

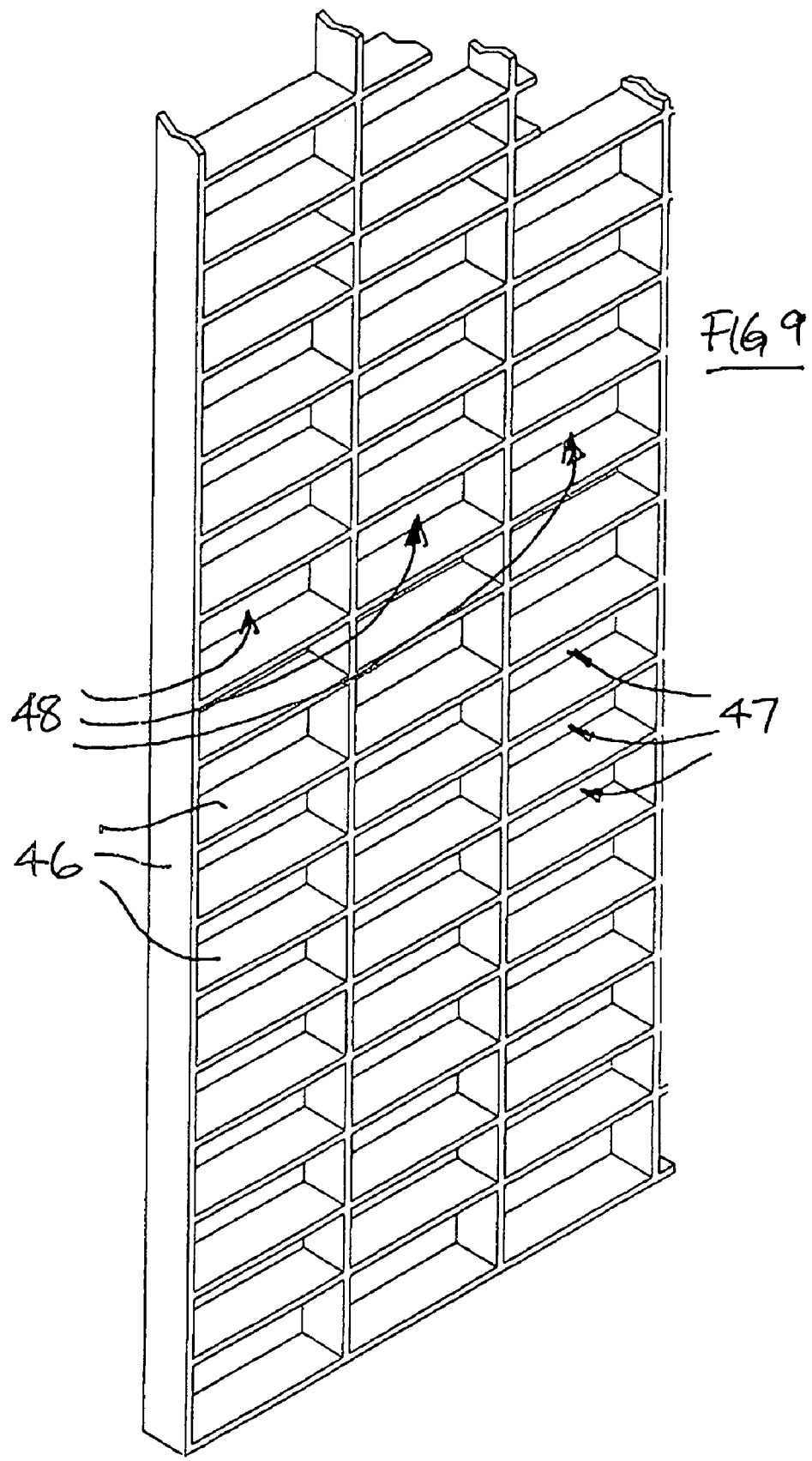

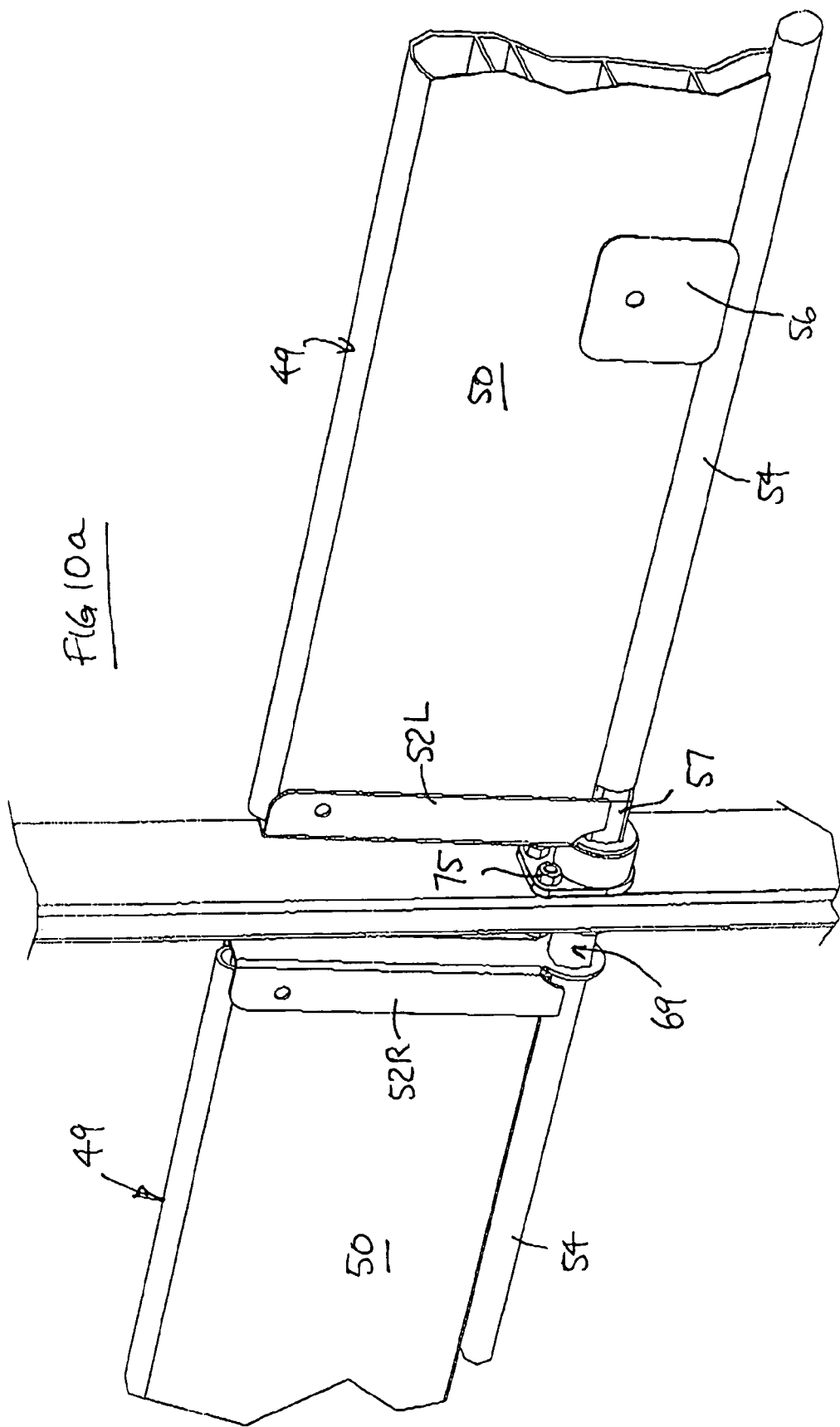

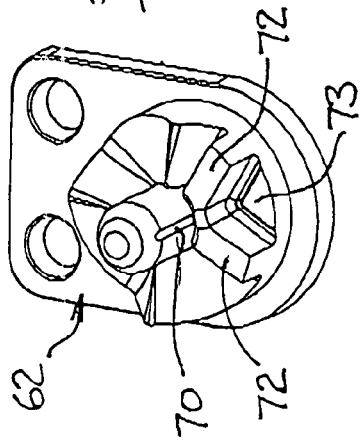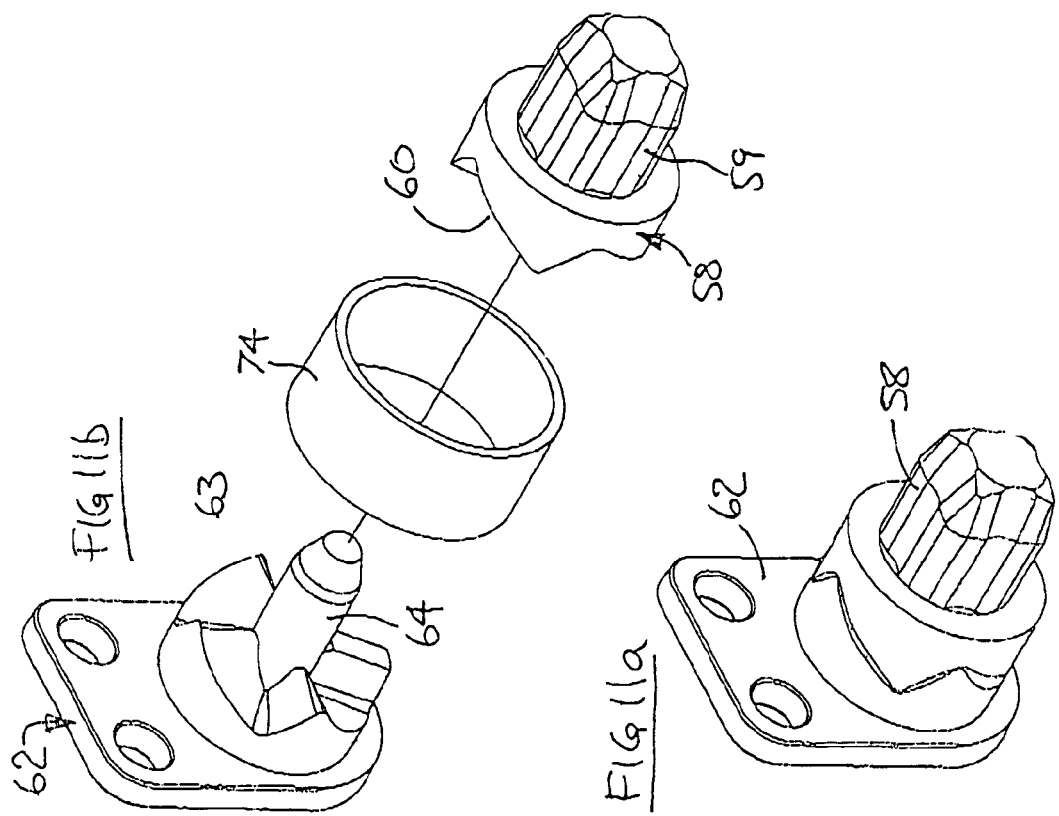

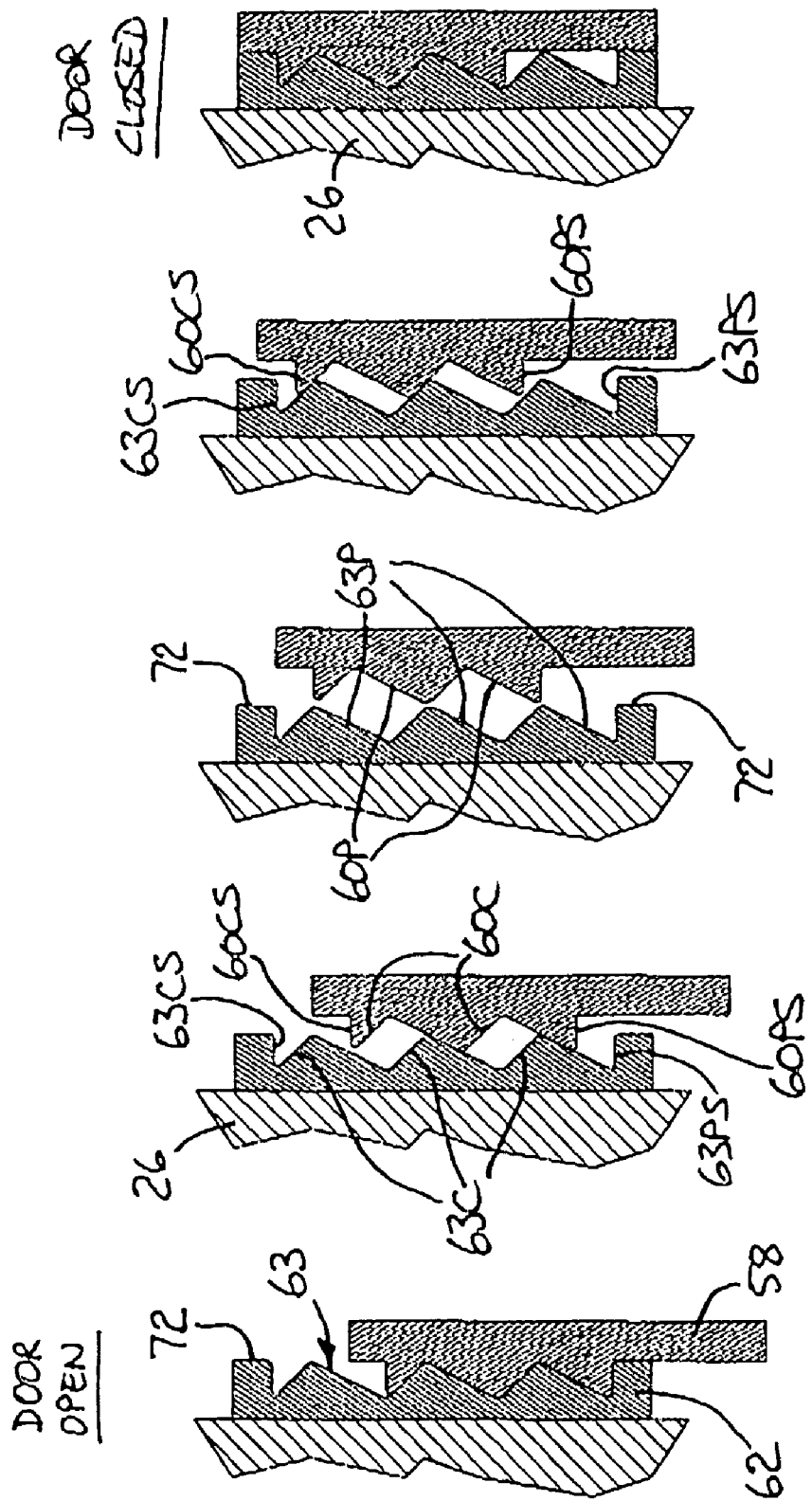

CAGE FOR TRANSPORTING POULTRY

This invention relates to cages for transporting live poultry, e.g by truck, between farm and processing plant.

BACKGROUND TO THE INVENTION

Such cages are traditionally arranged, for handling around the farm, and lifting on and off the truck, by a fork lift. On the truck the cages are stacked typically two high, the weight of the upper cage resting on the lower cage.

The birds are in the cages for no more than a few hours, but still the losses in the traditional conventional cages are higher than they should be. The birds can be injured and damaged from hard physical contact with the walls and floors of the cages. In the traditional cage designs, there are projections and sharp edges, inherent in the design thereof, which can also damage the birds.

Another type of injury can happen when water forms pools on the floor or tray of the cage. The water may be excrement or precipitation water. In cold weather, the water freezes, and the birds can become trapped as a result of their feet being frozen to the floor, and injuries can follow especially when the birds are jostled upon being extracted from the cage.

When the components of the cage with which the birds make prolonged contact (e.g the floor of the cage) are metal, the temperature thereof can become so hot—or so cold—that simple direct contact leads to physical injury to the birds.

On the transport truck, the cages may be jerked and bounced around. All too often, unfortunately, with the traditional designs, not only does this injure the birds, but also it can damage the cages. (Often, the worst violence occurs when the cages are being moved around an uneven farmyard on a fork lift.) So, it is common for the farmer to have to spend time repairing (re-welding, usually) the cracked and broken frameworks of the cages.

Also, the traditional cages also have not been particularly designed to safeguard the birds, and to keep them from being injured as they are flung violently against the components of the cage. Other things that can lead to distress of the birds, such as lack of ventilation, proper drainage, ease of cleaning, etc, have not been given due attention in the traditional designs. The traditional cages have not been designed to maximise the safety and comfort of the birds; it is recognised that, by paying attention to these aspects, losses due to birds being killed and injured during transport can be significantly reduced. Also, it is not uncommon for the cage doors of traditional cages to open accidentally during transport, and for the birds inside to be lost.

It is an aim of the present invention to alleviate these problems. In the invention, much of the framework is bolted. Bolted joints are inherently pre-stressed by the tightness of the bolts, which makes such joints much more able to absorb bending and other stresses that can arise from the rough and abusive treatment meted out to transport cages in the farm-to-market context.

A poultry transport cage of the kind as described herein, as a structure, does not have the typical fragility associated with traditional live-poultry cages, of course, any cage can be damaged, but the freedom from constant need for small running repairs, due to the overall general robustness of the new manner of construction, is very marked. Also, in the new design, if components do get damaged, they can be unbolted, and either easily repaired, or easily replaced. For example, a careless handler might run a lift fork into one of the plastic fences; the plastic fence then must be removed and replaced, but it easily can be, as will be described.

GENERAL FEATURES OF THE INVENTION

In one aspect of the invention, the cage apparatus includes a support framework, being of metal components including metal uprights and members, fixed together into an open rectangular configuration, which is of such length, width, and height, that several of them can be stacked two high on a truck. The framework is so arranged as to define poultry-receiving trays, which are arranged in a plurality of rows of trays, and a plurality of columns of trays. The trays have respective floor panels, left and right side panels, roof panels, rear closure panels, and front doors, which together define respective rectangular chambers inside the trays.

The rectangular chambers are so configured as to be suitable for receiving several poultry birds per tray. Some of the panels of each tray are of open lattice form, having openings of such size and configuration that the chamber inside the tray can be characterised as light and well-ventilated, the panels and door being also of such size and configuration as substantially to prevent the protrusion of body parts of the birds outside the tray.

In respect of each tray, the floor panel thereof is a panel of plastic, which extends from the front to the rear, and from the left side to the right side of the tray chamber, and also in respect of each tray, with the several poultry birds contained therein, the floor panel thereof is of such form and robustness, and is so mounted in the support framework, that water entering the tray substantially cannot form pools, over any portion of the upper surface of the floor panel with which the birds can come into contact.

Preferably, the floor panel has a middle area, and front and rear end areas, and the floor panel is domed, in that the middle area lies at least 0.7" higher than a line joining the front and rear end areas.

Preferably, the floor panel is formed with drain slits, which are wide enough to permit liquids on the upper surface of the floor panel to drain through the floor panel, and are narrow enough that the feet of the birds are not snagged therein.

DETAILED DESCRIPTION OF PREFERRED EMBODIMENTS

By way of further explanation of the invention, exemplary embodiments of the invention will now be described with reference to the accompanying drawings, in which:

FIG. 1 is an isometric view of a live-poultry cage that embodies the invention, shown from the front.

FIG. 2 shows the cage of FIG. 1 from the rear.

FIG. 3 is the same view as FIG. 1, with some components omitted.

FIG. 4 is a perspective view corresponding to FIG. 2, with the same components omitted.

FIGS. 5a, 5b, 5c are front, side, top, orthogonal views of the components of the cage shown in FIGS. 3,4.

FIG. 7 is an isometric view of a floor panel of the cage of FIG. 1, and FIG. 7a is a side view thereof.

FIG. 8a is an elevation of a narrow fence panel of the cage of FIG. 1, and FIG. 8b is an elevation of a wide fence panel thereof.

FIG. 9 is a close-up of an area of the fence panel of FIG. 7.

FIG. 10a is a pictorial view showing the structure of a door panel of the cage of FIG. 1.

FIG. 11a is a view of a door hinge and cam assembly of the cage of FIG. 1, and FIG. 11b is the same view shown exploded.

FIG. 12 is a close-up of one of the cam components.

FIGS. 13a-13e are diagrams showing the cam action of the door hinge.

Figure 6:
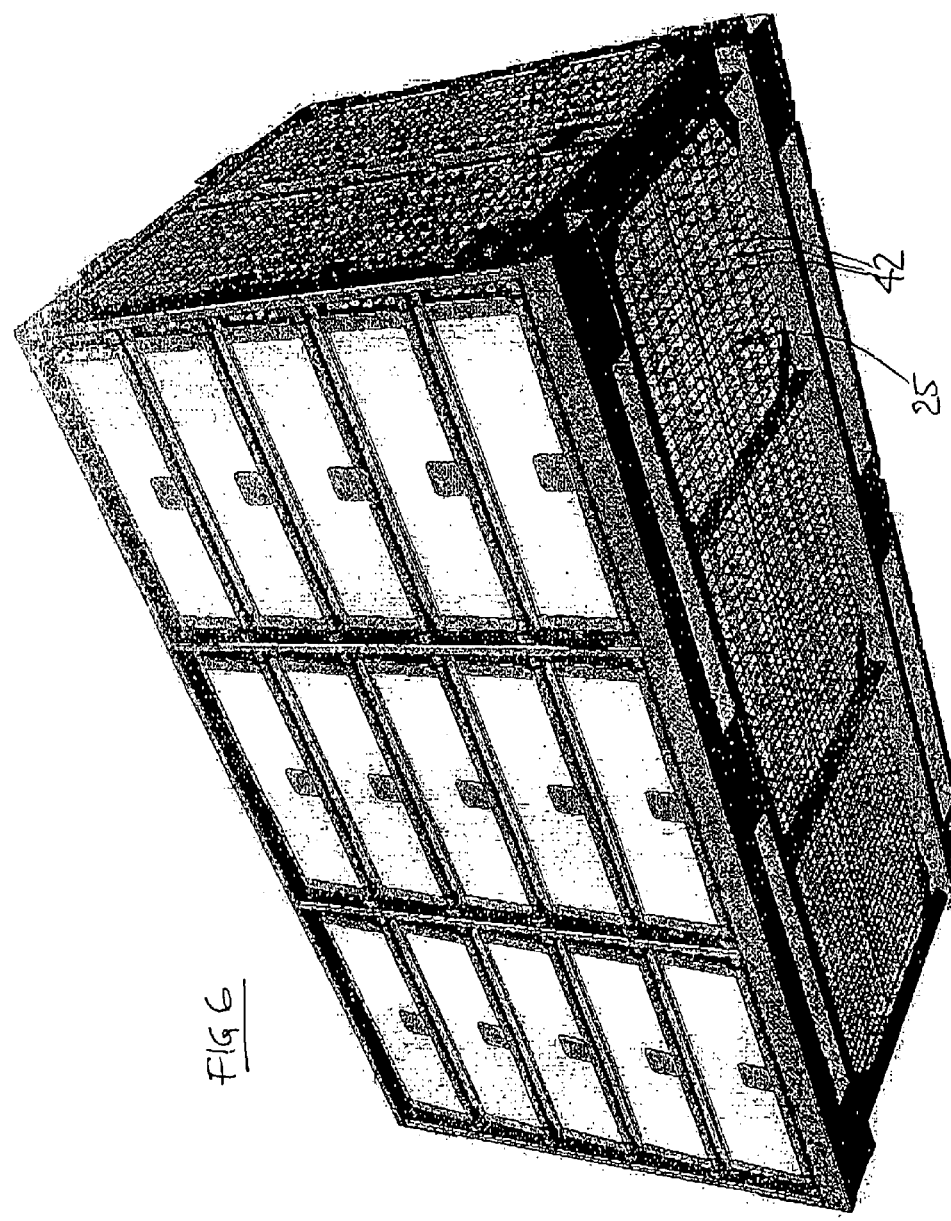
FIG. 6 is a perspective view of the whole cage of FIG. 1, from the front and underneath.

The apparatuses shown in the accompanying drawings and described below are examples which embody the invention. The scope of the invention is not necessarily limited by specific features of the exemplary embodiments.

The cage 20 as shown in the drawings includes a support framework 23 of metal bars and sections. The bars and sections are attached together by a combination of welded joints and bolted joints.

The support framework 23 basically defines a series of trays 24, which are fifteen in number in the embodiment shown. The trays 24 have respective floors, i.e the cage 20 includes fifteen floors. The floor panels 25 (FIG. 7) are identical, each floor panel being formed as an individual plastic moulding, preferably in polypropylene.

The cage 20 includes four front uprights 26F, four middle uprights 26M, and four rear uprights 26R. (The uprights are referred to generically herein under the numeral 26.) The cage 20 also includes four top bars 27, four bottom bars 28, a front-top bar 29, a front-bottom bar 30, a rear-top bar 32, and a rear-bottom bar 34.

The cage 20 includes receptacles 35 for receiving the forks of a fork lift truck (or the fork lift attachment on a farm tractor).

The floor panel 25 (FIGS. 7,7a) is approximately 3'6" deep (i.e front to back), by 2'6" wide. The floor panels 25 rest on crossbars 36, being respective front 36F, rear 36R, and middle 36M crossbars. The cross-bars span between the uprights 26. The front 36F and rear 36R crossbars span between adjacent uprights, whereas the middle crossbars 36M span right across between the outer left middle uprights and the outer right middle uprights. The front and rear crossbars have welded-on gussets 37, by which the crossbars are secured to the uprights 26 with bolts. The middle crossbars 36M pass through holes in the uprights.

The floor panels 25 are formed with ledges 38 that clip or snap over the crossbars; and the floor panels may also be bolted to the crossbars for added security. The floor panels 25 rest each oil three of the crossbars, one front, one rear, one middle. Each of the floor panels 25 is moulded with a curvature such that the middle area 40M of the floor panel naturally sits roughly ¾" above the front 40F and rear 40R areas.

The floor panels 25 are formed with slits 39. The slits are narrow enough that the feet and other body parts of the birds in the trays cannot become snagged in the slits. The slits 39 are large enough that water (including precipitation water, excrement liquids, etc) cannot collect on the panels 25, but runs through the slits and drains away. The slits should not exceed about 0.1" in width, to avoid the danger that the birds' feet might get caught. The slits should be at least 0.05" wide to ensure adequate drainage.

As mentioned, if water were allowed to pool on the floor panel 25, it might freeze and adhere the birds' feet to the floor panel, leading to injuries. To avoid pooling, the floor panels are arched or domed, i.e the raised middle area 40M of the floor panel means that water does not tend to pool anywhere on the floor panel. The floor panels are each intended to support approximately 100 lbs weight of poultry, and the designer should see to it that the panel 25 is sturdy enough to remain domed even under this full weight (and with a suitable margin of tolerance).

If the floor panels were simply made as flat sheets, such a weight of poultry might cause the panel to sag, between the floor supports, and pooling might occur in the sagged areas. The domed configuration gives the floor panel an upper surface that slopes, and thus sheds water; the domed configuration also means that, even if the panel were to deflect under the heavy load, the deflection should not lead to a depressed area, which might contain a pool of water, as might happen if the panel were nominally flat.

The floor panel 25 is strengthened underneath by floor-panel-ribs 42. Since the floor panel rests on the cross-bar 36M in its middle area 40M, the floor-panel-ribs 42 need not support the floor panel as if the floor-panel was supported only at the front and rear. Thus, the floor-panel-ribs 42 need not be dimensioned as they would have to be if they extended over the full front/back depth of the floor panel; rather, the floor-panel-ribs 42 are arranged as front 42F and rear 42R sections of the ribs. The floor-panel-ribs 42 thus protrude only a small distance below the upper surface 43 of the floor panel, thus maximising the open height of the tray, and the space between trays. Preferably, the downwards protrusion distance R (FIG. 7a) of the ribs 42 is less than 1.5"; the ribs are between 0.7" and 0.13" thick; and the ribs are spaced less than 3" apart.

The floor panel 25 has a single-axis curvature, the middle area 40M of the upper surface 43 being about one inch higher than a line joining the front and back areas 40F,40R of the upper surface. This amount of doming, on the floor panel as illustrated, ensures the upper surface 43 of the floor panel remains domed even when the floor panel is fully loaded with poultry. If the doming were less than about 0.7" when the floor panel is unloaded, the doming might not be present when the panel is loaded.

In use, the line joining the front and back areas 40F,40R of the floor panel preferably is horizontal. The amount of doming should not be more than about 2", i.e the floor should not be sloped so much that the birds tend to slide down the slope, and congregate at the low areas.

The expression "domed" should be understood to include configurations (not shown) in which the upper surface of the floor panel is raised in the middle due to the upper surface comprising two flat surfaces lying at an angle to each other. Alternatively, the floor panel can be low-pyramidal in configuration. Preferably, however, the upper surface is smoothly curved, so that there is no opportunity for birds to be injured as they move over (or are dragged by other birds over) ridges or angles in the floor. When curved, the upper surface may be single-axis (as shown) or compound-axis, and the curvature may be discontinued locally, e.g at the fixing locations 38, as desired.

Being ribbed, the floor panel as shown in FIG. 7 combines lightness and rigidity. The slitted top surface 43 the floor panel, on which the birds will rest, should be flat and uniplanar (i.e should be without projections and depressions, and other forms that might injure the birds—of course, the surface is gently curved because of the doming). The ceiling of each tray area is formed by the (ribbed) underside of the floor panel above. The ribbed undersides of the three lowermost floor panels can be seen in FIG. 6.

Each tray is bounded by fence panels 45. The vertical rear fence panels 45R are relatively wide, corresponding to the horizontal width of the trays. As shown, the horizontally placed roof or top panels 45T are identical to the rear panels. (Some designers may prefer to specify e.g sheet metal panels for the roof of the cage.)

The side fence panels 45S are the same height, but are narrower, as shown in FIGS. 8a,8b. The narrower side fence panels (45N in FIG. 8a) are used in pairs, one behind the other; a left pair of side fence panels is used on the left side, and a right pair on the right side, of the cage. Middle pairs of fence panels preferably are identical to the left and right pairs of side fence panels, and are used internally, between the columns of trays.

The wider fence panels 45W (FIG. 8b) are of the same nominal size as the floor panels 25, i.e 2'6" wide by 3'6" high. The narrower fence panels 45N are 1'6"×3'6".

The fence panels 45 are of open ribbed lattice or mesh form. They are moulded in polypropylene, or vinyl, etc. The fence panels are mounted within the support framework 23, but the fence panels preferably do not take any of their robustness from being actually attached to and supported by the framework. The fence panels should be designed to be rigid and robust enough, in themselves, without additional support, to be easily manhandled for assembly.

As shown, the lattice ribs 46 are arranged to define open-ended rectangular boxes. In deciding upon the dimensions of the open boxes 47 defined by the lattice ribs, the designer should see to it that the boxes 47 are tight enough to contain the birds, i.e to make sure no parts of the birds can protrude outside the tray. The designer should note that containment of the birds is a matter, not just of the area of the open space defined by the box 47, but also of the depth of that open space (I.e the depth as defined by the lattice ribs); where the box is deep, the box can be that much more open in area and still prevent the extremities of the body parts of the birds from protruding. (If the fence panel were formed, by contrast, as a thin sheet, with holes, such holes would have to be very much smaller than the boxes 47, in order to prevent body parts of the birds from protruding.)

Also, the lattice ribs 46 of the fence panel 45 should be numerous enough to, and so arranged as to, give the fence panel the rigidity and robustness it needs in order to be manhandled into place, basically by hand, during assembly, and in order to resist the inevitable knocks and abuse it will receive during service. The moulded ribs 46 should be between 0.07" and 0.13" thick, and preferably about 0.1" thick.

At the same time, the boxes 47 should be wide open to the extent to ensure good ventilation. Another reason for the boxes to be wide open is to promote visibility, whereby operators at the poultry processing plant, even when standing well to the side of the cage, can still see through the lattice—in order to tell whether, for instance, any birds have been trapped in the cages. For this reason, preferably the (rectangular) boxes 47 defined by the lattice ribs 46 should be orientated with the major axes thereof aligned horizontally, as shown.

It has been found that boxes 47 that are approximately 1"×2½" in area, where the ribs 46 that define the boxes are 0.7" deep, perform satisfactorily according to the above described criteria. Preferably, the boxes are between 2" and 4" wide horizontally, and between 0.7" and 2" high vertically, and at least 0.5" deep.

It will be noted that in some locations within the fence panel, the boxes defined by the ribs of the fence panels are of different dimensions. Thus, at 48, the vertical distance between adjacent ribs is larger than at the other locations. The reason for the higher boxes 48 at these locations is to promote easy flush-out.

When the birds have bee removed from the cages, the cages are flushed out. Flushing out is done, usually, with the doors still open, and with the jet of water directed, from the front, in through the open door. The accumulated dirt, excrement, and other debris, is washed and flushed to the backs of the cages. The wider-spaced ribs at 48 serve as flush-ports, to allow the debris to pass out easily from the trays. The flush-ports should be between 1.5" and 3" high, vertically.

The flush-ports 48 are located to lie just above the back areas 42R of the upper surfaces 43 the floor-panels 25, for this purpose, i.e in order for the debris to slide out easily. Where the same moulded fence-panel 45 is to serve as a component of all cages including those that have three or four or five trays, the designer should provide flush-ports at heights that will coincide with the back-edges of the floor-panels in all the configurations.

Preferably, hoverer, the lattice ribs 46 should not all be that widely spaced. If the ribs were more widely spaced, of course there would be fewer of them. The need for robustness in the fence panels is such that at least most of the ribs should be closer together—given that the thickness of the fence-panels is a premium dimension.

Attached onto the support framework are hinged doors 49. These are all to the same design, and are fifteen in number in the embodiment shown, one for each tray 24. Each door 49 is hinged along its bottom edge, whereby its top edge can tip forward and down, for the purpose of opening up the tray. The door 49 is on a double-detent system, whereby, when the door is partly open, the door snaps either to its open position or its closed position, whichever is nearer. When the door is open, some force is needed to start the door moving towards the closed position, but once the door has been moved to about halfway, the door automatically snaps the rest of the way. The equivalent is true when the door is closed.

Figure 10B:
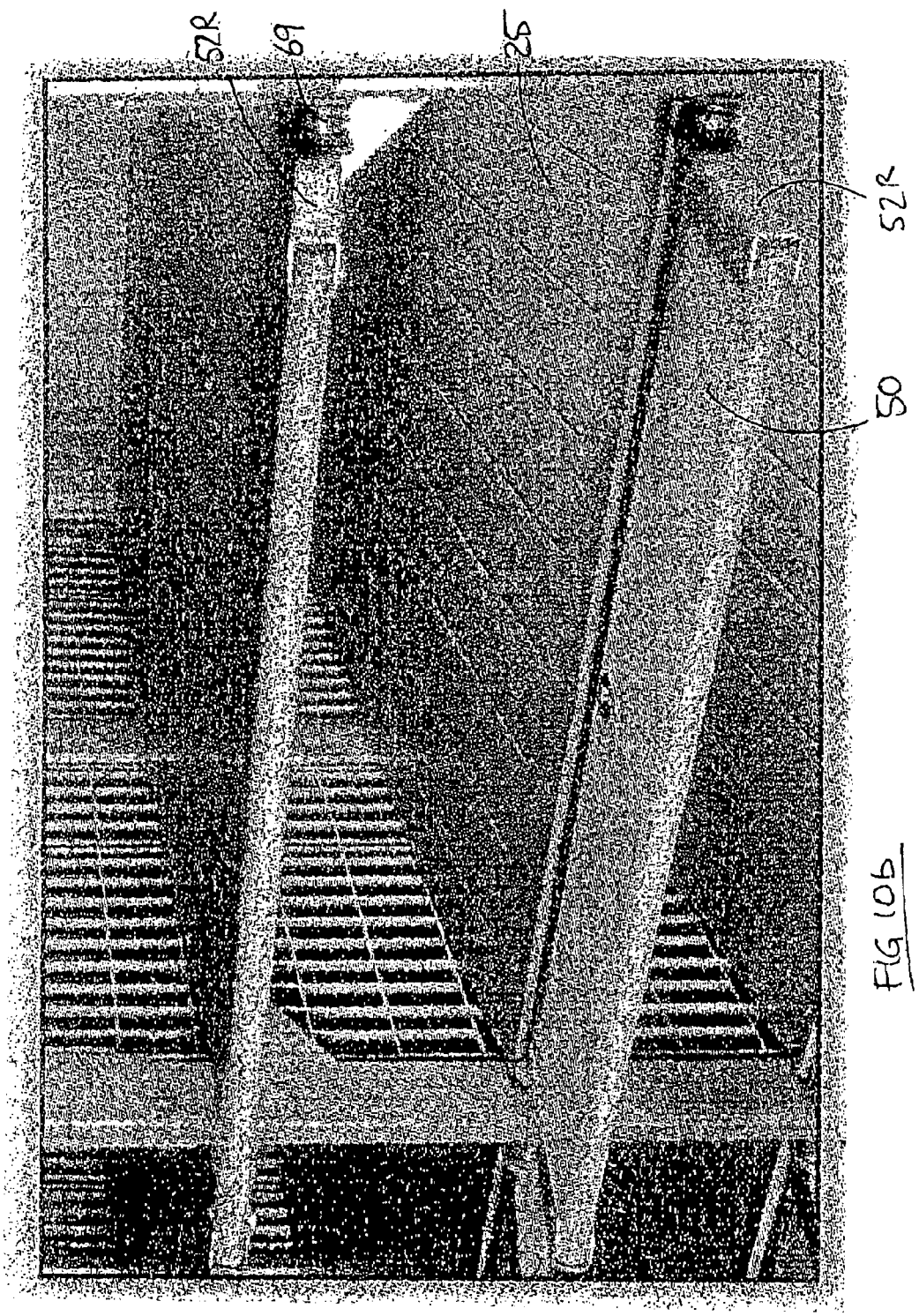
FIG. 10b shows the doors in the open position.

The door is formed from a plastic door-panel 50. The door-panel 50 comprises a length of plastic (polyethylene), of extruded fluted profile, as shown (FIG. 10a). At the left and right ends of the door-panel are left and right end-pieces 52L,52R. Each end-piece is formed with an aperture, and a hinge-rod 54 runs through the apertures. The plastic extrusion that forms the door-panel 50 is secured by being bolted to the end-pieces 52L,52R. The door-panel is bolted also to the lug 56 welded to the hinge-rod 54. The extruded door-panel 50 preferably should be profiled to fit snugly against the hinge-rod 54, so that the panel can take some rigidity and support from the hinge-rod.

The hinge-rod 54 is basically a round tube (1" diameter), except that at its left end the hinge-rod has been swaged into a hollow square shape 57. The aperture in the end-piece is such that the aperture can slide over both the round form and the square form 57 of the hinge-rod, whereby the left end-piece 52L can be identical to the right end-piece 52R. Once assembled over the hinge-rod, the end-pieces are welded to the hinge-rod.

The manner in which the door 49 is attached into the support framework 23 will now be described. FIGS. 11a, 11b show a door-cam-component 58. This is an iron casting, having a square protrusion 59, which is sized to be pushed inside the hollow square form 57 at the left end of the hinge-rod 54. When fitted, the door-cam-component 58 thus presents an axially-facing door-cam-face 60 which is fast with, and rotates with, the hinge-rod 54.

The drawings also show a frame-cam-component 62. This is another iron casting, which is arranged to be bolted to the upright 26. This frame-cam-component 62 has a frame-cam-face 63, which remains fixed. The frame-cam-component 62 includes a protruding pin 64, being of ½" diameter, which fits inside a corresponding socket in the door-cam-component 58. The engagement of the pin 64 in the socket serves as a bearing, whereby the left end of the hinge-rod 54 is guided for rotation relative to the frame 23. The pin 64 can also slide axially in/out of the socket, whereby, as the cam faces 60,63 ride over each other, as the door 49 rotates, the door can move bodily left/right as it rotates, while the pin/socket bearing remains engaged.

At the right end, the round end of the hinge-rod 54 enters a hole in the upright 26. A flanged sleeve 68 of plastic is fitted between the hinge-rod and the upright 26, and serves as a bearing. A compression spring 69 fits over the hinge-rod 54, and exerts an axial force between the right end-piece 52R and the sleeve 68. Thus, the spring 69 acts to urge the door 49 to the left. When the door 49 rotates, the two cam-faces 60,63 ride over each other, which gives rise to a corresponding axial movement of the door, whereby the door moves bodily to the right, against the spring.

The operation of the cam faces 60,63 is as shown in FIGS. 13a-13e. These drawings are diagrammatic—the real cam-faces are circular, but here they are illustrated with the circumferences thereof laid flat. In FIG. 13b, the cam faces 60,63 are slightly apart, but are being urged together by the spring. Under this urging, the closing-faces 60C,63C of the cams come together, until the door-closed-stop-face 60CS meets the frame-closed-stop-face 63CS. Thus, in the FIG. 13b position, the spring urges the door to the closed position, as defined by the door-closed-stop-face 60CS contacting the frame-closed-stop-face 63CS, as in FIG. 13a. To open the door, this force must be overcome.

By comparison, starting from FIG. 13d, the spring 69 again urges the cam faces 60,63 together, but now the effect is that the opening-faces 60P,63P of the cam faces engage, whereby the cams move until the door-open-stop-face 60PS strikes the frame-open-stop-face 63PS, which is the door-open position as shown in FIG. 13e.

It will be noted that the door closing-faces 60C,63C of the cams slope more gently than the door opening-faces 60P,63P. Thus, it takes more force to open the doors than to close the doors. In fact, the designer should set the spring 69 and the geometry of the cams such that it takes a force of about six lbs acting against the door to close the door, and about eight lbs to open it. This level of force is suitable when the trays contain each about one hundred pounds weight each of poultry.

The door-open-stop-face 60PS, the door-closed-stop-face 60CS, and the corresponding door-open-stop-face 60PS and frame-open-stop-face 63PS do not slope, but lie in a plane that is radial and parallel to the axis of the hinge-rod 54. This alignment is preferred, as It makes for positive, well-defined stop positions of the door 49. It also prevents overshoot, which might tend to occur if the said stop faces were angled.

It might be considered that the door-open and door-closed positions might equally well be defined by providing an over-centre spring, arranged to cause the door to snap against suitably-placed ledges or abutments. However, the manner of arranging the stops as described herein, using the stop-faces, is preferred over that. The spring-loaded door can be travelling quite fast as it approaches the open or closed position, and it would be all too easy for the door to open and close with a loud bang. Poultry birds can easily be spooked by such bangs; keeping the birds calm should be one of the aims of the design of the transport cage, as realised by the door opening and closing system as described herein.

FIG. 12 show the frame-cam-component 62. Attention is drawn to the protruding pin 64, and to the groove 70 in the underside thereof. As mentioned, the cages 20 are hosed down with water after unloading, and inevitably water enters the hinge mechanism; the water must be able to drain away from between the close-spaced relatively-moving surfaces in the hinge mechanism, or in cold weather the hinge might freeze and seize. The groove 70 provides an outlet for water that collects between the pin 64 and the socket 65.

The plateau 72 on the door-cam-component 58 should also be noted. The plateau 72 is the body of metal between the stop-faces 60CS,60PS. The plateau 72 has a recess 73, which serves the same purpose as the groove 70 in the pin 64, namely to allow water to drain out from between the pin and socket. The combination of the groove 70 and the recess 73 means that, in cold weather, it is (almost) impossible for the hinge to retain enough water that freezing would cause seizing.

A shield-ring 74 fits around the two cams 58,62. The shield-ring 74 deflects dirt and water from entering the hinge and cam mechanism. The shield-ring itself must not contribute to water retention, so it should be a loose fit over the cams—generally, it should be at least 0.07" clear diametrally over the cams. The outer diameter of the cast iron face cams is 1½". Axially, the shield-ring 74 should be shorter than the FIG. 13c (most-spaced) condition of the cams. The shield-ring may be lined with plastic, if desired.

The designer should pay attention to the material of the cams 58,62. It might be considered that the cams could be made from metals or alloys containing zinc, aluminum, etc; however, the acids in poultry excrement tend to cause chemical reactions with those metals, which can lead to the surfaces seizing under some conditions. High-carbon cast-iron does not suffer this disadvantage. The cam components (and other components of the cage) can be plated or painted for the sake of cosmetic appearance, but it is not economically feasible to protect the components by that method alone over a long service period. Cast iron, even with no surface coating, can be expected to function without seizing.

When loading the poultry into the cage, generally the farm operator opens the doors 49 by hand, places the birds into the trays 24 by hand, and then closes the doors by hand. At the processing plant, in most cases the procedure is automated. The cage 20 is fork-lifted onto a platform, which is then tipped to an inclination of about thirty degrees, doors down. The birds fall against the doors 49, and the weight of the birds causes the doors to snap open. The birds slide down the now-inclined floors of the trays, and onto a conveyor.

After the cages have emptied, the platform is righted, and, after washing down, it is arranged that an arm of the platform mechanism sweeps upwards across the front of the cage, automatically knocking all the doors 49 from open to closed.

It is all too easy for the components of the cage to be damaged due to abusive or careless usage, and also due to accidents such as driving a blade of the fork lift into the cage. The doors 49 especially can be damaged by abuse, and the prudent designer should make provision for easy changing of the doors.

As shown, the door 49 can be removed upon unscrewing the cam-bolts 75. That enables the frame-cam-component 62 to be moved clear of the left upright 26, whereupon the right end of the hinge-rod 54 simply pops out of the hole 67 in the right upright 26. The door hinge arrangement is such that the hinge is sturdily and robustly bearinged, has low friction, has a consistent predictable (and quiet) snap action, yet the door can be released, and a new door inserted, in a few moments. These benefits arise from the design of the arrangement, and not as result of expensive materials and extra components.

One aspect of the construction of the cage is the fact that the crossbars 36 can easily be braced and gusseted. It is the fact that the crossbars have been simply welded to the uprights, in previous designs, that has led to the cages being so unreliable, in that the flexure and stressing due to twisting etc movements of the cage (not to mention knocks and other violent abuse) during service causes the welds to crack. In the present design, the gussets 37 formed of bent sheet metal are welded to the crossbar 36. Now, the area and length of weld is such that the stress on the weld is minuscule. It is the gussets 37 that are now bolted to the upright 26. The bolted joint locks in a degree of pre-tension, which means the gusset remains still held tightly against the upright even under violent twisting etc.

As a result, it is highly unlikely that the gusseted bolted joint between the crossbar and the upright will fail due to being overstressed. It would only be required to fit a new crossbar if the old one were damaged, e.g due to contact with the fork lift, road accident, etc. Even then, replacing the gusseted crossbar is simply a matter of unbolting the old one and bolting in a new one, with no welding needed.

The manner in which the support framework of the cage is put together will now be described in more detail.

The roof of the framework comprises a basic roof-rectangle 76 of welded bars. The bars 27 have gussets 79 which add robustness and bracing. The floor-rectangle 80 of the framework 23 also is of welded construction. In addition to a floor-rectangle 80, which is similar to the roof-rectangle 76, the floor also includes receptacles 35 for lift forks, and suitable gussets and bracing for consolidating the receptacles into the floor.

The left and right sides of the support framework 23 are of bolted construction. That is to say, the roof piece 82 and floor piece 83 are bolted to the front 26F, rear 26R, and middle 26M uprights. The roof and floor pieces are formed with gussets included, as shown, whereby the joints are well spread, and consequently low-stressed.

Being bolted, the uprights at the left and right sides of the framework can be replaced easily, which is advantageous since they are so located as to be liable to be damaged, e.g by lift forks. The top and bottom rectangles 76,80 are less likely to be damaged, and so there is little disadvantage, from the ease-of-repair standpoint, in those being welded. The internal or separator uprights are bolted, like the left and right side uprights, although of course the internal frames are very unlikely to be damaged.

Figure 14:
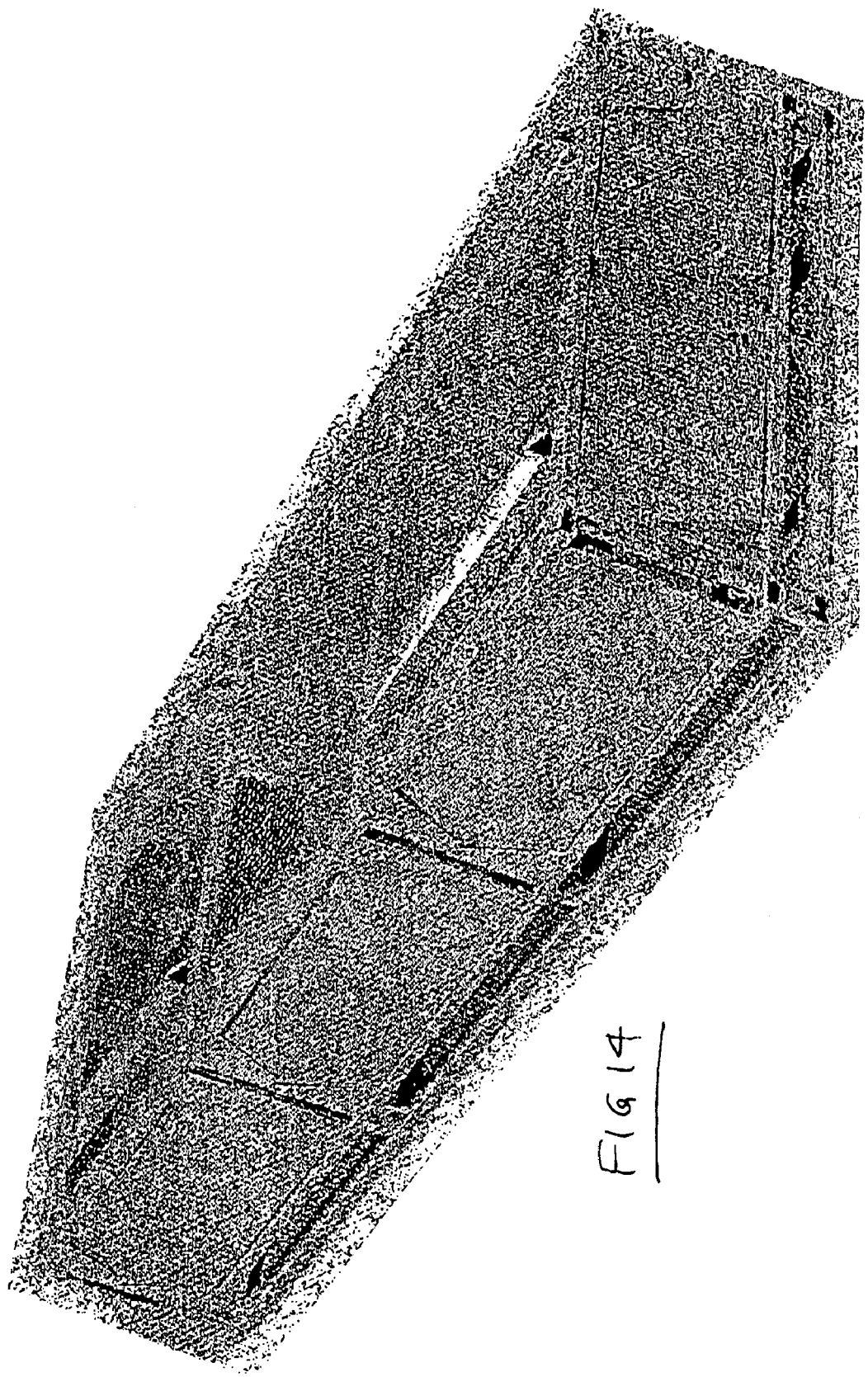
FIG. 14 is a view of the cage of FIG. 1, shown in a partly disassembled condition, for shipping.

The designer may choose to specify that the roof, the floor, the sides and the middle frames all be welded together, to form a unitary shell of the framework, as opposed to the sides and middle uprights being bolted to the roof and floor rectangles. However, if the cage were welded, in the factory, to the finished configuration, as shown in FIG. 4 etc, that would be uneconomical from the shipping standpoint. Preferably, the top and bottom rectangles are welded in-factory, but the cage is shipped with the uprights 26 not assembled, but awaiting bolting together after delivery. The knock-down shipping package is illustrated in FIG. 14.

It is emphasized that the horizontal crossbars 36 are not welded directly to the uprights, as mentioned. The main purpose of the (gusseted) crossbars 36 is to support the floor panels 25, but of course, once bolted in place, the crossbars 36 serve as very effective braces and struts for the framework as a whole; it can be expected that the incidence of failure of the bolted joints between crossbars and uprights will be very low.

In FIG. 4, there are twenty-four gusseted crossbars 36, twelve at the front and twelve at the back. The middle crossbars 36M, which support the middle areas 40M of the floor-panels 25, are formed as lengths of tubing, which pass through holes in the middle uprights 26M. The middle crossbars are not gusseted, and do not act to brace the rest of the framework. Each middle crossbar has left and right locating-clips 85, which hold the middle crossbar in place between the uprights, but apart from that the middle crossbar 36M is basically loose in its holes in the uprights.

Once the framework 23 of the cage has been welded, the fence panels 45 are assembled into the framework. The internal fence panels are assembled first. The (narrow) front internal fence panel simply rests in the space between the front upright and the middle upright; the rear internal fence panel likewise simply rests in the space between the middle upright and the rear upright. These internal fence panels need not be fixed, e.g with bolts, to the uprights, and preferably are not fixed. In use, the middle fence panels will be kept in position by the floor panels.

(For assembly purposes, it can be advantageous to refrain from bolting in the gusseted crossbars 36F,36R until at least most of the fence panels are in place.)

The (wide) rear fence panels 45 are inserted into the spaces defined between the bars 32,34 and the adjacent uprights. The rear fence panels are kept in position by being sandwiched between the gussets 86 and the crossbars 36R.

The pairs of (narrow) fence panels that make up the left and right side fences are held in place by bolted brackets 87,89. These left and right side panels are especially vulnerable to being damaged by the lift forks, and so it is arranged that they can be removed and replaced by unbolting the brackets 87,89. The brackets 87,89 hold the side fence panels against falling outwards; as with the internal fence panels, the presence of the floor panels prevents the side fence panels from falling inwards.

As to the roof of the cage, that may comprise three wide fence panels 45T, or, as preferred by some users, the roof may comprise sheet metal, either welded or bolted to the roof-rectangle 76 of the frame. Where the plastic fence panels are used, they are prevented from falling down, into the cage, by the provision of three roof-crossbars 90, which are arranged loosely in the framework, similarly to the middle crossbars 36M. The cage need not have a floor, as such, since the floor panel of the bottom tray will serve that purpose; however, the cage may be fitted with an additional floor if desired.

Once all the fence panels are in place—i.e the three (wide) rear fence panels, the (narrow) left, right, and internal fence panels—the fifteen floor panels are inserted. The floor panels preferably should be bolted to the front and/or the rear crossbars; if merely clipped to the crossbars, there is a likelihood that they will become detached therefrom, during service. As mentioned, once the floor panels are in place, they serve to hold the fence panels in place.

Figure 16:
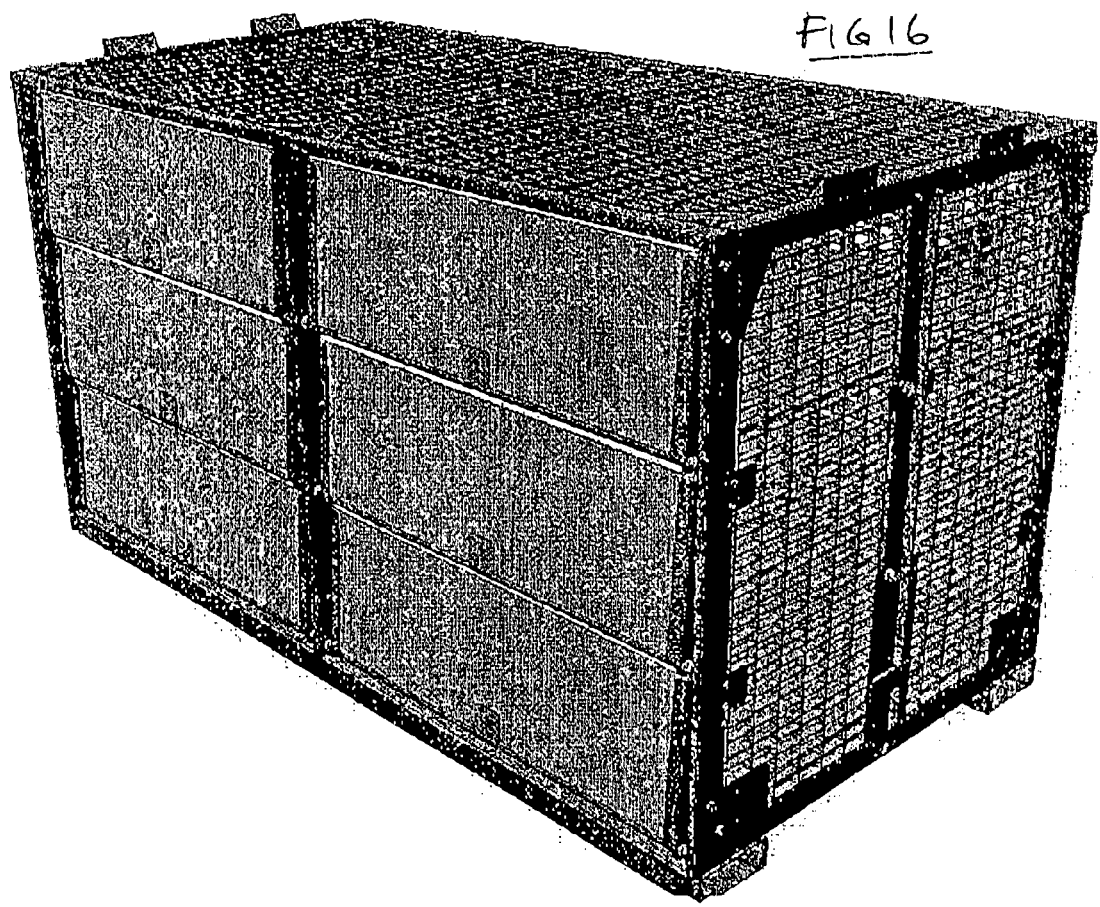
FIG. 16 is a pictorial view of another cage that embodies the invention.
Figure 17:
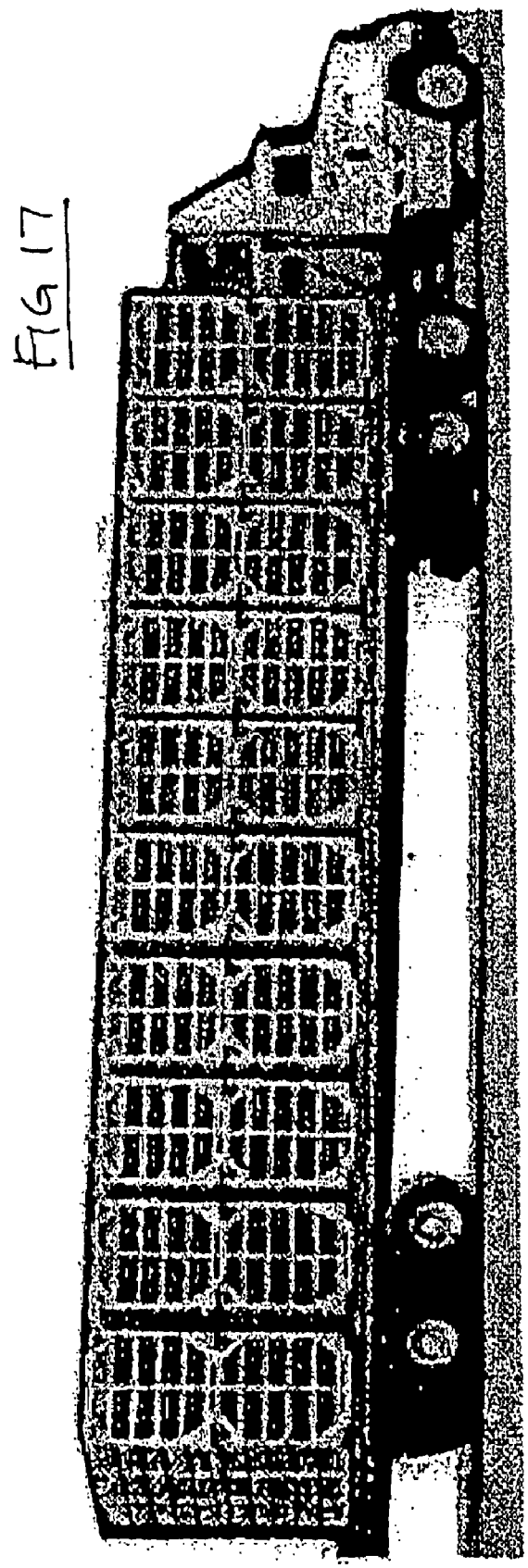
FIG. 17 is a view showing twenty of the poultry cages stacked two high on a truck.

The trays 24 as defined by the framework and panels preferably should be each 3'6" from front to back. In the three-wide configuration, the trays preferably should be 2'6" from left to right. As to height, the trays should be each about 10" high for chickens (broilers), 12" high for roasters, and 14" high for turkeys. It is convenient for the live-poultry transport cages to be about 4'6" high, so the three sizes of trays can be readily accommodated as e.g five-high (broilers), four-high (roasters), or three-high (turkeys), all using the same basic framework and components. The weight of the empty cage, as shown, is about 850 lbs. Laden weight is about 2500 lbs. If the trays were sized appropriately to take less than 50 lbs of poultry per tray, or more than 200 lbs, that would be non-preferred in the invention, because the 100 lb per tray size leads advantageously to a cage unit of the size that is very suitable for trucking, stacked in the two-high configuration (FIG. 16).

In the side or end elevational view of the cage (FIG. 5*b*), the cage is roughly square, i.e roughly 3'6"×3'6". With a smaller cage, it might have been preferred to make the side fence as one wide panel piece, rather than the two narrower pieces. However, a fence panel of the kind as described herein, at 3'6" square, would be too large. A fence panel that large would be unstable and likely to buckle during assembly, and would be hard to support adequately during service. Also, a metal framework of that size should have the middle uprights, as shown, to be adequately robust, and the use of two side panels matches that.

It will be noted that the components from which the cage is made are mainly the same components repeated many times. This is true of the fence panels and floor panels, which is especially advantageous since they are plastic mouldings; also of the cam components, i.e the iron castings. The components that require more labour-intensive fabrication and welding are the components which are fewer in number in the cage as a whole; the components that are repeated many times in the cage are such as to lend themselves to low-labour mass production techniques. It will be understood that the labour needed to assemble the floors and fences into the cage is tiny, compared with the labour that would be needed if the floors were made of steel, and welded into place. Similarly, bolted joints, though perhaps more expensive than welded joints in terms of materials and components, can be less expensive once the skilled labour of the welder is factored in. Especially as regards the manner of attaching the crossbars to the uprights, the overall cost of the bolted joints, as measured over the service lifetime of the cage, is significantly less than the overall cost of comparable welded joints.

Figure 15:
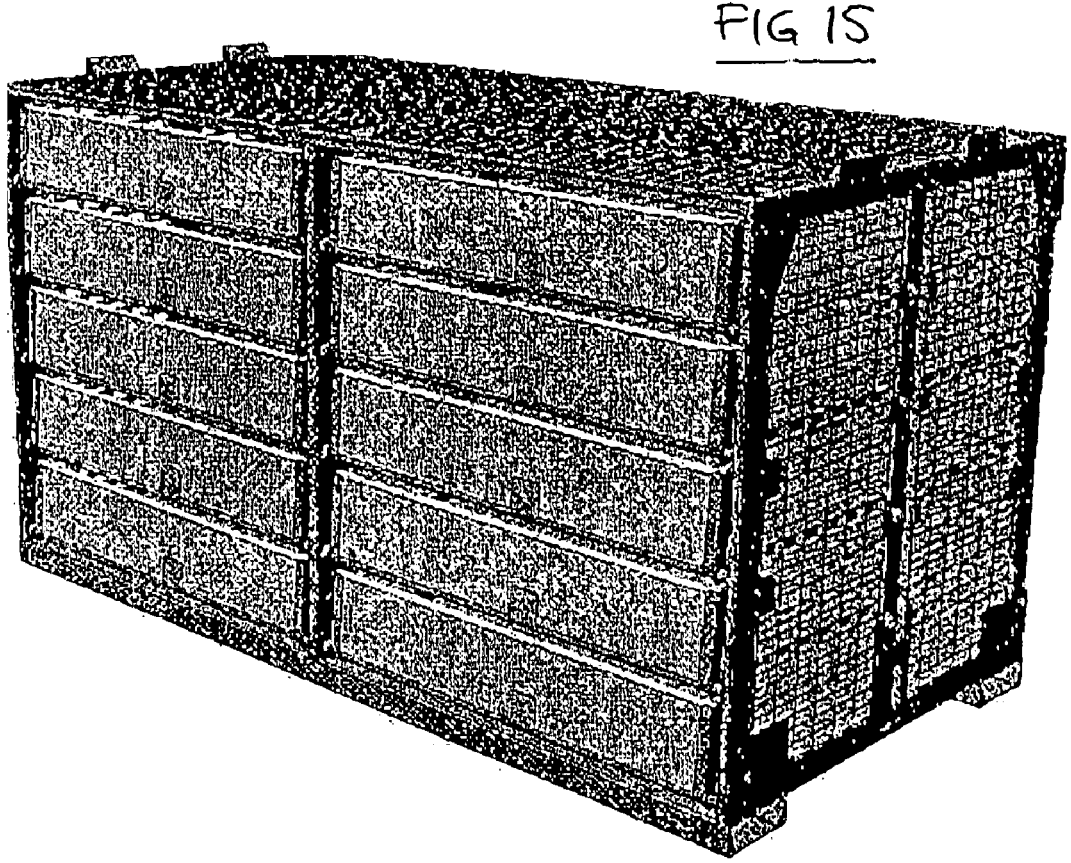
FIG. 15 is a pictorial view of another cage that embodies the invention.

As shown in the drawings, the trays can be arranged in different configurations, e.g the three-rows-two-columns configuration (FIG. 16), the five-rows-two-columns configuration (FIG. 15), and others. It will be understood that many of the components of the cage are such that they can be used without modification, other than as to the required number of the components, in the different configurations. Others of the components can be made suitable for the different configurations simply by being cut to a longer or short size. This inter-usability makes for flexible and inexpensive manufacturing of a large range of configurations. In addition, while it is not really possible, once a cage has been built, to change the number of columns of trays, it can be a fairly simple matter to change the number of rows. This is done simply by repositioning the cross bars, and adding more floor panels—although of course new doors of appropriate height would be needed.

In another option, doors are provided at both ends of the trays.

It is emphasized that the birds in the trays are surrounded by plastic, i.e they basically cannot lie in contact with any metal surfaces, neither walls, floors, doors. Any surface they can lie in contact with is plastic. Contact with the edges of metal components can cause physical injuries, whereas contact with the edges of plastic components is much less likely to do so. Prolonged contact with large metal surfaces can cause burns (hot or cold), whereas contact with a plastic surface is much less likely to do so. Preferably, even the ceiling of the tray is the (plastic) underside of the ribbed plastic floor panel, although the ceiling is less critical, since the birds can only touch the ceiling momentarily. Small areas of metal, such as bolt heads, do not matter.

The invention claimed is:

1. Cage apparatus, wherein:
   the apparatus includes a plurality of separate individual cages;
   in respect of each one of the cages of the plurality:
   the individual cage is physically suitable for containing and transporting live poultry on a road-transport truck;
   the cage includes a support-framework, including uprights and cross-members fixed together in an open rectangular configuration;
   the individual cage is of such length, width, and height dimensions that the plurality of cages can be stacked upright on the truck, with live poultry birds contained therein;
   the individual cage is a sturdy, stand-alone, self-contained structure, whereby each individual cage, with poultry birds contained therein, is physically capable of being picked up as a unit, and of being lifted onto the truck as a unit;
   the support-framework is so configured as to define poultry-receiving tray-chambers, which are arranged, in the cage, in a plurality of rows, and a plurality of columns;
   in respect of each tray-chamber of each cage:
   the tray-chamber is rectangular, being defined by a floor, left and right side panels, a roof panel, a rear closure panel, and a front door, of the support-framework;
   the floor, left and right side panels, the roof panel, and the rear closure panel, are fixed into the support-framework, and remain so fixed throughout operation of the cage to load, unload, and transport, the birds;
   the front door is pivotable with respect to the support-framework, between an open position and a closed position;
   in the open position of the front door, poultry birds can pass into and out of the tray-chamber through the open door, and in the closed position of the front door, the tray-chamber is then closed, whereby poultry birds cannot pass into nor out of the tray-chamber of the support-framework;
   the tray-chamber is so configured as to be suitable for receiving several poultry birds therein;
   at least one of the panels of the tray-chamber is of open lattice form, having openings of such large size and configuration that the tray-chamber can be characterised as light and well-ventilated, the openings being also of such small size and configuration as substantially to prevent the protrusion of body parts of the birds outside the tray-chamber;
   the floor of the tray-chamber includes a floor-panel of plastic, and extends from the front to the rear, and from the left side to the right side, of the tray-chamber;
   the plastic floor-panel is in such a location, in the tray-chamber, that birds being transported inside the tray-chamber have their feet in direct touching contact with the floor-panel;
   the floor-panel has either no perforations, or, if having perforations, the perforations are so small that the foot of a poultry bird cannot enter therein;
   the floor-panel is of such form and robustness, and is so mounted in the support-framework, that, with several poultry birds contained in the tray-chamber, liquid entering the tray-chamber substantially cannot form pools, over substantially any portion of the upper surface of the floor panel with which the birds can come into contact.

2. Apparatus of claim 1, wherein the floor panel has a middle area, and front and rear end areas, and the floor panel is domed, in that the middle area lies at least 0.7" higher than a line joining the front and rear end areas.

3. Apparatus of claim 1, wherein the floor panel is formed with drainage slits, which are wide enough to permit liquids on the upper surface of the floor panel to drain through the floor panel, and are narrow enough to resist snagging the feet of birds.

4. Apparatus of claim 1, wherein each floor panel is a one piece moulding, and the support framework includes means for supporting each floor panel at the front thereof, at the rear, and in the middle, the floor panel being rigid enough that, when so supported, deflection of the floor panel due to the weight of poultry thereon is not enough to create pooling.

5. Apparatus of claim 1, wherein:
the support-frame includes metal components;
the panels and the door are of plastic; and
the cage is so arranged that birds housed within the tray-chamber can rest in contact with only plastic material, and substantially cannot rest in contact with the metal components.

6. Apparatus of claim 1, wherein the front door includes a spring-biassing means, which is effective to bias the door towards the closed position with a biassing force of such small magnitude that the door automatically opens, against the biassing force, when the cage is tipped, by the weight of birds pressing against the door.

7. Apparatus of claim 6, wherein the said biassing force is of such large magnitude that the door remains closed unless the cage is tipped in such manner that birds inside the tray-chamber fall against the front door.

8. Apparatus of claim 6, wherein:
the spring-biassing means is arranged to be effective to bias the door towards the closed position only when the door is at, or almost at, the closed position; and
the spring-biassing means is arranged to be effective to bias the door towards the open position only when the door is at, or almost at, the open position.

9. Apparatus of claim 1, wherein each individual cage of the plurality is of such length, width, and height dimensions that the plurality of cages can be stacked two high on the truck.

10. Apparatus of claim 1, wherein:
the support framework of the cage includes sockets for receiving the forks of a fork lift truck; and
the sockets are sturdily integrated into the support framework of the cage, whereby the individual cage can be raised and transported by a fork lift truck.

11. Cage apparatus, wherein:
the apparatus includes a plurality of separate individual cages;
in respect of each one of the cages of the plurality:
the individual cage is physically suitable for containing and transporting live poultry on a road-transport truck;
the cage includes a support-framework, including uprights and cross-members fixed together in an open rectangular configuration;
the individual cage is of such length, width, and height dimensions that the plurality of cages can be stacked upright on the truck, with live poultry birds contained therein;
the individual cage is a sturdy, standalone, self-contained structure, whereby each individual cage, with poultry birds contained therein, is physically capable of being picked up as a unit, and of being lifted onto the truck as a unit;
the support-framework is so configured as to define poultry-receiving tray-chambers, which are arranged, in the cage, in a plurality of rows, and a plurality of columns;
in respect of each tray-chamber of each cage:
the tray-chamber is rectangular, being defined by a floor, left and right side panels, a roof panel, a rear closure panel, and a front door, of the support-framework;
the floor, left and right side panels, the roof panel, and the rear closure panel, are fixed into the support-framework, and remain so fixed throughout operation of the cage to load, unload, and transport, the birds;
the front door is pivotable with respect to the support-framework, between an open position and a closed position;
in the open position of the front door, poultry birds can pass into and out of the tray-chamber through the open door, and in the closed position of the front door, the tray-chamber is then closed, whereby poultry birds cannot pass into nor out of the tray-chamber of the support-framework;
the tray-chamber is so configured as to be suitable for receiving several poultry birds therein;
at least one of the panels of the tray-chamber is of open lattice form, having openings of such large size and configuration that the tray-chamber can be characterised as light and well-ventilated, the openings being also of such small size and configuration as substantially to prevent the protrusion of body parts of the birds outside the tray-chamber;
the floor of the tray-chamber includes a floor-panel of plastic, and extends from the front to the rear, and from the left side to the right side, of the tray-chamber;
the plastic floor-panel is in such a location, in the tray-chamber, that birds being transported inside the tray-chamber have their feet in direct touching contact with the floor-panel;
the floor-panel has either no perforations, or, if having perforations, the perforations are so small that the foot of a poultry bird cannot enter therein;
the floor-panel is of such form and robustness, and is so mounted in the support-framework, that, with several poultry birds contained in the tray-chamber, liquid entering the tray-chamber substantially cannot form pools, over substantially any portion of the upper surface of the floor panel with which the birds can come into contact; p1 the apparatus includes a fence panel, which is a one-piece plastic moulding, of such height as to extend from top to bottom of the cage;
the fence panel is arranged to form a vertical wall for all the tray-chambers forming one column of tray-chambers;
the vertical fence panel is so arranged in relation to the uprights of the support framework as to be prevented from falling outwards relative to the cage by engagement with the said uprights;
the vertical fence panel is so arranged in relation to the floor panels of the tray-chambers in the column of tray-chambers as to be prevented from falling inwards relative to the cage by engagement with the said floor panels, whereby, but for the presence of the floor panels, the fence panel would fall inwards.

12. Apparatus of claim 11, wherein:
the fence panel is of rectangular form, having top, bottom, left, right edges;
substantially no points on the said edges protrude out from the support framework; substantially all points on the said edges lie so close against the uprights and cross-members of the supports-framework as to be protected thereby from with solid objects outside the cage.

13. Apparatus of claim 11, wherein the fence panels are of the said lattice form, the openings being defined by ribs, and being configured as deep, wide open boxes.

14. Apparatus of claim 13, wherein at a vertical location of the fence panel that lies just above one of the floor panels, the ribs defining the boxes are spaced vertically further apart than at other vertical locations of the fence panel, the wider spacing being such as to define a flushing port, to allow debris washed from inside the tray-chamber to be flushed out therethrough.

15. Cage apparatus, wherein:
   the apparatus includes a plurality of separate individual cages;
   in respect of each one of the cages of the plurality:
   the individual cage is physically suitable for containing and transporting live poultry on a roadtransport truck;
   the cage includes a support-framework, including uprights and cross-members fixed together in an open rectangular configuration;
   the individual cage is of such length, width, and height dimensions that the plurality of cages can be stacked upright on the truck, with live poultry birds contained therein;
   the individual cage is a sturdy, stand-alone, self-contained structure, whereby each individual cage, with poultry birds contained therein, is physically capable of being picked up as a unit, and of being lifted onto the truck as a unit;
   the support-framework is so configured as to define poultry-receiving tray-chambers, which are arranged, in the cage, in a plurality of rows, and a plurality of columns;
   in respect of each tray-chamber of each cage:
   the tray-chamber is rectangular, being defined by a floor, left and right side panels, a roof panel, a rear closure panel, and a front door, of the support-framework;
   the floor, left and right side panels, the roof panel, and the rear closure panel, are fixed into the support-framework, and remain so fixed throughout operation of the cage to load, unload, and transport, the birds;
   the front door is pivotable with respect to the support-framework, between an open position and a closed position;
   in the open position of the front door, poultry birds can pass into and out of the tray-chamber through the open door, and in the closed position of the front door, the tray-chamber is then closed, whereby poultry birds cannot pass into nor out of the tray-chamber of the support-framework;
   the tray-chamber is so configured as to be suitable for receiving several poultry birds therein;
   at least one of the panels of the tray-chamber is of open lattice form, having openings of such large size and configuration that the tray-chamber can be characterised as light and well-ventilated, the openings being also of such small size and configuration as substantially to prevent the protrusion of body parts of the birds outside the tray-chamber;
   the floor of the tray-chamber includes a floor-panel of plastic, and extends from the front to the rear, and from the left side to the right side, of the tray-chamber;
   the plastic floor-panel is in such a location, in the tray-chamber, that birds being transported inside the tray-chamber have their feet in direct touching contact with the floor-panel;
   the floor-panel has either no perforations, or, if having perforations, the perforations are so small that the foot of a poultry bird cannot enter therein;
   the floor-panel is of such form and robustness, and is so mounted in the support-framework, that, with several poultry birds contained in the tray-chamber, liquid entering the tray-chamber substantially cannot form pools, over substantially any portion of the upper surface of the floor panel with which the birds can come into contact;
   the front door includes a spring-biassing means, which is effective to bias the door towards the closed position with a biassing force of such small magnitude that the door automatically opens, against the biassing force, when the cage is tipped, by the weight of birds pressing against the door;
   the support framework includes spaced-apart hinge-supports;
   the apparatus includes bearings, arranged in the hinge-supports to guide the door for hinging rotation about a hinge-axis straddling between the hinge-supports, between the open position and the closed position;
   the apparatus includes interacting cam faces, being a door-cam-face which is rotationally fast with the door, and a frame-cam-face which is rotationally fast with one of the hinge-supports;
   the bearings are so structured that the said two cam faces can move axially relatively, and the cam faces are so structured as to remain in camming engagement during such axial movement;
   the biassing means includes a spring, arranged to bias the cam faces towards each other;
   the interacting cam faces are formed with respective complementary door-opening cam-slopes and respective complementary door-closing cam-slopes, these cam-slopes being so angled that axial movement of the cam faces is correspondingly accompanied by rotational movement of the door;
   the cam-slopes are so arranged that, when the door is rotated away from its closed position, at first the door-closing cam-slopes engage, and the spring biasses the door to rotate back towards its closed position, but when the door is rotated still further away from its closed position, the cam-slopes go over-centre, whereby the door-closing cam-slopes disengage and the door-opening cam-slopes engage, and whereby the spring biasses the door now to rotate towards its open position.

16. Apparatus of claim 15, wherein:
   the door-opening cam-slopes are steeper than the door-closing cam-slopes;
   whereby the spring-induced door-closing force is greater than the spring-induced door-opening force.

17. Apparatus of claim 15, wherein:
   the inter-acting cam faces are formed with respective complementary door-open stop-faces and respective complementary door-closed stop-faces;
   these stop-faces are so placed as to define the door-closed and door-open positions of the door;
   the stop-faces lie in respective planes that lie substantially radially and axially relative to the hinge-axis.

18. Apparatus of claim 15, wherein the cam faces are confined within a circumscribing circle, centred on the hinge axis, having a diameter of less than two inches.

19. Apparatus of claim 15, wherein the surfaces of the cam that rub over each other during rotation of the door are provided with drainage channels, arranged so that water penetrating between the said surfaces cannot collect and remain therebetween, but drains away.

20. Apparatus of claim 15, wherein the spring is a compression coil spring, concentric with the hinge axis.

* * * * *